US006609282B2

(12) United States Patent
Morrissey et al.

(10) Patent No.: US 6,609,282 B2
(45) Date of Patent: Aug. 26, 2003

(54) DEVICE FOR INSTALLING BOLT RETAINERS

(75) Inventors: Brian Thomas Morrissey, Peabody, MA (US); Louis Francis Zukowski, Salem, MA (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 09/965,352

(22) Filed: Sep. 27, 2001

(65) Prior Publication Data

US 2003/0088961 A1 May 15, 2003

(51) Int. Cl.[7] .......................... B23P 19/00
(52) U.S. Cl. .......................... 29/229
(58) Field of Search .......................... 29/229, 225, 270, 29/243.56, 809

(56) References Cited

U.S. PATENT DOCUMENTS 2,837,812 A * 6/1958 Erdmann .................... 29/229
3,785,037 A * 1/1974 Erdmann .................... 29/229
4,449,295 A 5/1984 Alexander, Jr.
4,862,572 A 9/1989 Jeromson, Jr. et al.

* cited by examiner

*Primary Examiner*—Robert C. Watson
(74) *Attorney, Agent, or Firm*—Nathan D. Herkamp; Pierce Atwood

(57) ABSTRACT

A device for installing a bolt retainer onto a bolt includes a support bar and a handle attached to the support bar. A retainer dispensing assembly mounted to the support bar includes a rail capable of holding a number of bolt retainers thereon. A retainer seat is attached to the support bar, and the retainer seat and retainer dispensing assembly are relatively positioned so that the retainer dispensing assembly delivers bolt retainers to the retainer seat. A slide member is slidingly mounted in a channel in the support arm. The slide member slides between a first position in which it engages a bolt retainer on the retainer seat and a second position in which it drives the bolt retainer onto a bolt.

14 Claims, 6 Drawing Sheets

DEVICE FOR INSTALLING BOLT RETAINERS

BACKGROUND OF THE INVENTION

This invention relates generally to installing bolt retainers and more particularly to devices for installing bolt retainers onto bolts in gas turbine engines.

A gas turbine engine includes a compressor that provides pressurized air to a combustor wherein the air is mixed with fuel and ignited for generating hot combustion gases. These gases flow downstream to a turbine section that extracts energy therefrom to power the compressor and provide useful work such as powering an aircraft in flight. A typical gas turbine engine compressor includes a rotor having several rows of circumferentially-spaced rotor blades, which are interposed with several rows of circumferentially-spaced compressor stator vanes. Each corresponding row of rotor blades and stator vanes comprises a stage of the compressor. As ambient air flows through each succeeding compressor stage during operation, it is successively compressed to produce the compressed air that is supplied to the combustor.

A compressor rotor ordinarily includes a plurality of structural elements joined together by bolted joints. For example, one common configuration includes a forward spool (comprising the first and second stages), a forward shaft, a rotor disk (comprising the third stage), and a rear spool (comprising the remaining stages) all bolted together. Typically, the compressor rotor is assembled by inserting the bolts, which are often referred to as slab head bolts, into bolt holes formed in an outer flange on the rear spool. Then, the remaining elements are stacked onto the bolts, and a nut is screwed onto each bolt to complete the assembly.

In many instances, a bolt retainer is installed onto each slab head bolt to retain the bolts in place during the assembly process. The bolt retainers are essentially C-shaped clips that are clipped into a recessed portion of the bolts such that the rear spool flange is located between the bolt heads and the retainers. In this position, the retainers prevent the bolts from falling out while the other rotor elements are being stacked thereon.

The retainers must slide along the face of the rear spool flange, making contact with the flange, to be installed correctly, and the bolt must be installed completely such that the bolt head makes contact with the underside of the spool flange. Otherwise, a retainer will be installed onto a larger diameter portion of the bolt, causing the retainer to plastically deform. This installation must also be done without damaging the face of the rear spool flange. Currently, the retainers are installed either by hand or with common pliers. This approach can be somewhat time consuming, resulting in increased overall assembly time and cost. The current approach can also result in improperly installed retainers and/or damage to the rear spool flange face.

Accordingly, there is a need for a means for quickly and precisely installing bolt retainers onto slab head bolts without damaging the retainer or the rear spool flange face.

BRIEF SUMMARY OF THE INVENTION

The above-mentioned need is met by the present invention, which provides a device for installing a bolt retainer onto a bolt. The device includes a support bar and a handle attached to the support bar. A retainer dispensing assembly mounted to the support bar includes a rail capable of holding a number of bolt retainers thereon. A retainer seat is attached to the support bar, and the retainer seat and retainer dispensing assembly are relatively positioned so that the retainer dispensing assembly delivers bolt retainers to the retainer seat. A slide member is slidingly mounted in a channel in the support arm. The slide member slides between a first position in which it engages a bolt retainer on the retainer seat and a second position in which it drives the bolt retainer onto a bolt.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
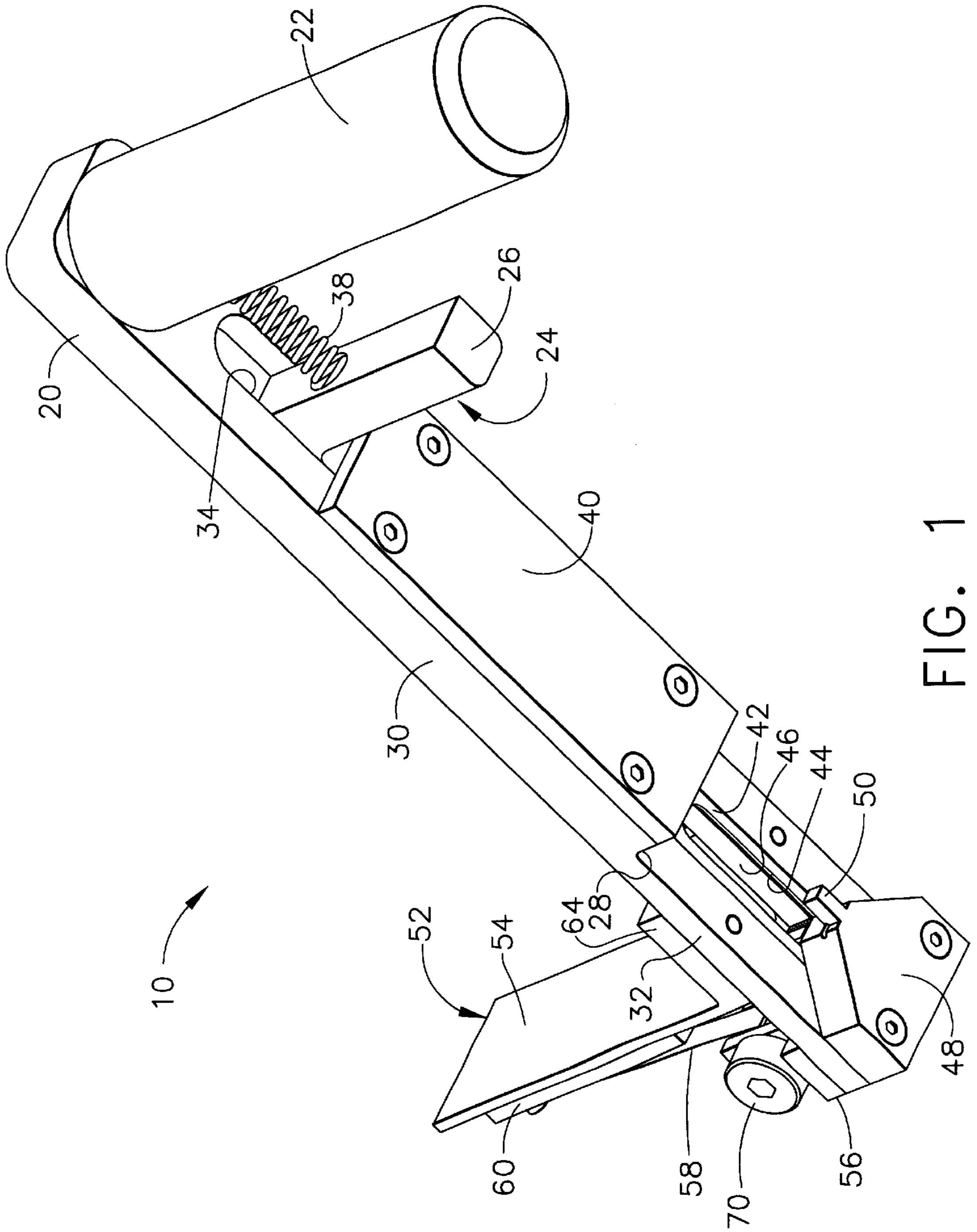
FIG. 1 is a perspective view of a device for installing a bolt retainer onto a bolt.
Figure 2:
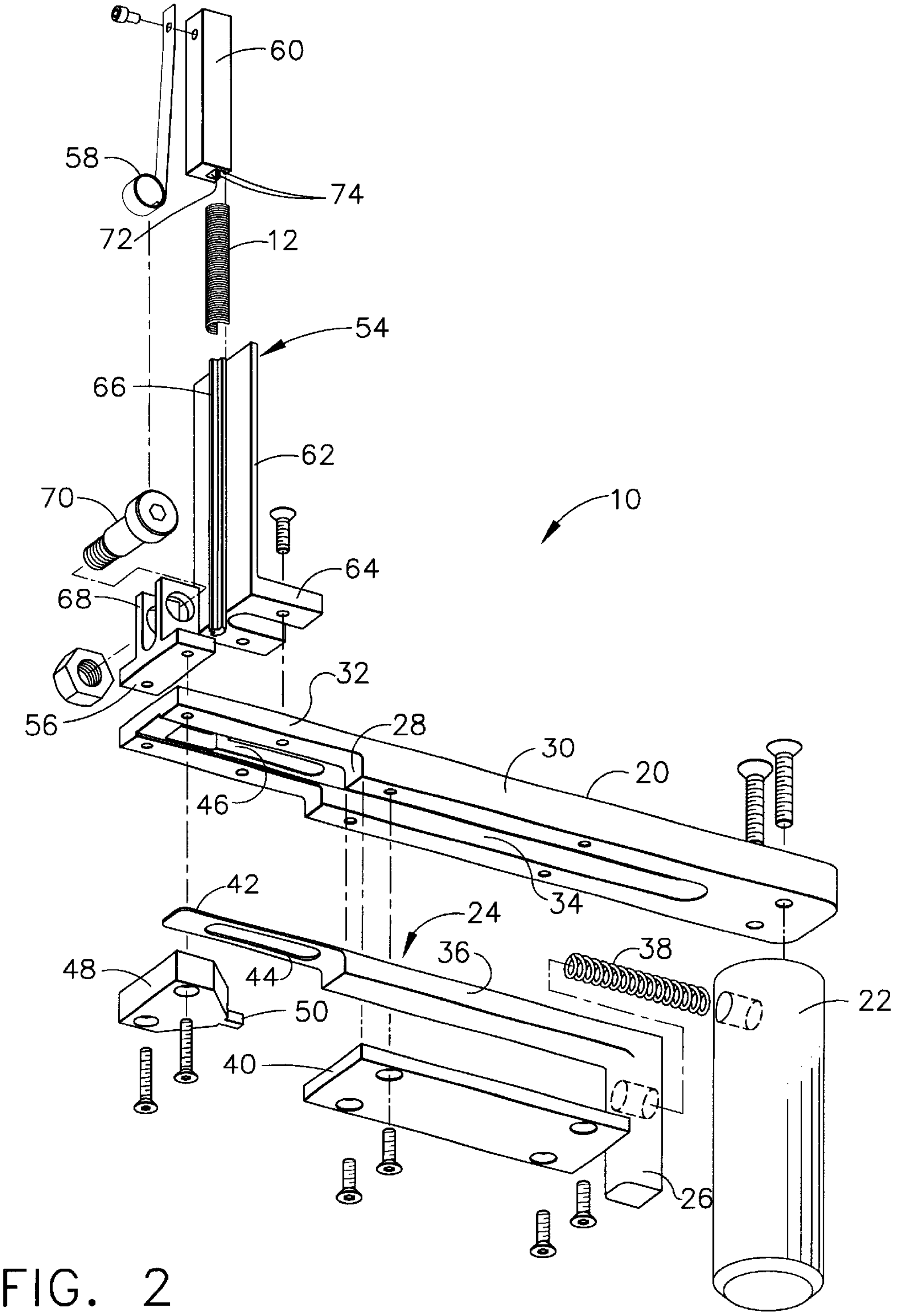
FIG. 2 is an exploded view of the device for installing a bolt retainer onto a bolt.

Referring to the drawings wherein identical reference numerals denote the same elements throughout the various views, FIGS. 1 and 2 show a device 10 for installing a bolt retainer onto a bolt. As shown in FIGS. 3–6, the device 10 is used to install clip-type bolt retainers 12 onto slab head bolts 14 inserted into the outer flange 16 of a rear spool 18 from a compressor rotor assembly. However, it should be noted that this is for purposes of illustration only. The present invention is not limited to this particular application, but can be used in many applications in which a bolt is inserted into a flange or other similar structure.

Referring again to FIGS. 1 and 2, the device 10 includes a support bar 20, a handle 22 and a slide member 24 arranged together in a gun-like configuration. The support bar 20 has first and second ends (referred to herein as the forward and rear ends, respectively), and the handle 22 is attached to the support bar 20 at or near the rear end. The handle 22 extends downwardly from the bottom side of the support bar 20, substantially perpendicular thereto. As used herein, terms such as “downward” and “bottom,” as well as “upward” and “upper,” shall relate to the device 10 as oriented in the Figures, although it is understood that the device 10 may assume other orientations at various times.

The handle 22 is shown as having a cylindrical shape, but can be of any shape and size that permits it to be easily grasped. The support bar 20 and the handle 22 can be fastened together by means of conventional fasteners such as screws or any other suitable means. The slide member 24 is slidingly mounted to the support bar 20 on the bottom side thereof and includes a trigger 26 that can be manipulated by a user grasping the handle 22 to move the slide member 24 longitudinally along the support bar 20.

A step 28 is formed in the bottom side of the support bar 20, intermediate the first and second ends thereof. The step 28 divides the support bar 20 into a relatively thick portion 30 adjacent the rear end and a relatively thin portion 32 adjacent the forward end. In one preferred embodiment, the thick portion 30 comprises approximately two-thirds of the total length of the support bar 20, and the thin portion 32 comprises approximately one-third of the support bar length. The thin portion 32 has about one-half the thickness of the thick portion 30. A channel 34 is formed in the bottom side of the support bar 20. The channel 34 extends longitudinally along the support bar 20 from the forward end thereof to a point near the rear end, just forward of the handle 22. Accordingly, the channel 34 traverses the step 28 and is disposed in both the thick portion 30 and the thin portion 32. Because of the different thicknesses of the thick and thin portions 30, 32, the portion of the channel 34 located in the thick portion 30 is relatively deep, while the portion of the channel 34 in the thin portion 32 is quite shallow.

The slide member 24 includes a main section 36 that is slidingly received in the deep portion of the channel 34 located in the thick portion 30 of the support bar 20. The main section 36 is an elongated block having a thickness that is substantially equal to the depth of the deep portion of the channel 34. The trigger 26 is formed on the rear end of the main section 36 and extends downwardly from, and substantially perpendicular to, the main section 36 so as to be parallel to the handle 22. A compression spring 38 is disposed between the handle 22 and the trigger 26 for biasing the slide member 24 forward in the channel 34 toward the forward end of the support bar 20. Thus, a user can move the slide member 24 backward, against the spring force, by pulling on the trigger 26. But when the trigger 26 is released, the spring 38 will cause the slide member 24 to slide forward.

A guide block 40 is attached to the bottom side of the thick portion 30 of the support bar 20 so as to cover the channel 34, thereby retaining the slide member 24 in the channel 34. The guide block 40 is sized to provide a gap between its rear edge and the handle 22. This allows the trigger 26 to extend out of the channel 34, and the length of the gap defines the slide member's range of motion.

The slide member 24 further includes a tongue 42 extending longitudinally from the forward end of the main section 36 so as to be primarily disposed in the shallow portion of the channel 34 located in the thin portion 32 of the support bar 20. The tongue 42 is substantially thinner than the main section 36 and is flush with the upper surface of the main section 36. The tongue 42 is preferably thinner than one of the bolt retainers 12. The main section 36 and the tongue 42 have the same width.

A first slot 44 is formed through the tongue 42. The first slot 44 extends longitudinally from a forward end spaced from the forward edge of the tongue 42 to a rear end located near the main section 36. A second slot 46 is formed through the support bar 20. The second slot 46 extends longitudinally in the shallow portion of the channel 34. The first and second slots 44, 46 both have a sufficient width to allow bolt retainers 12 and bolts 14 to pass therethrough, and the second slot 46 has an enlarged-width portion located at the forward end thereof. The first and second slots 44, 46 are laterally aligned and are longitudinally aligned when the slide member 24 is in its forward position. When the slide member 24 is pulled back, the slots 44, 46 are not fully longitudinally aligned, but do partially overlap.

A retainer seat 48 is attached to the bottom side of the support bar 20, at the forward end thereof. The retainer seat 48 is attached to the support bar 20 by any suitable means such as screws and has a tapered rear portion that is aligned with the enlarged-width portion of the second slot 46. The forward end of the tongue 42 is slidingly received in the shallow portion of the channel 34, between the support bar 20 and the retainer seat 48. A tab 50 extends rearwardly from the rear edge of the tapered portion of the retainer seat 48. The tab 50 is flush with the bottom surface of the retainer seat 48 and defines a gap between it and the support bar 20. As will be described in more detail below, the retainer seat 48 provides a surface for positioning a bolt retainer to be installed on a bolt and, through the tab 50, holds the bolt in proper position to receive the bolt retainer.

The device 10 includes a retainer dispensing assembly 52 mounted on the upper side of the support bar 20 for providing a source of bolt retainers 12 to be installed. The retainer dispensing assembly 52 is mounted at the forward end of the support bar 20, above the retainer seat 48, and includes a dispenser 54, a spring housing block 56, a constant force spring 58 and a retaining block 60. The dispenser 54 is an L-shaped element having an upright member 62 that extends perpendicularly upward from the support bar 20 and a mounting flange 64 by which the dispenser 54 is attached to the support bar 20 (by any suitable fastening means such as screws or the like). The mounting flange 64 has a U-shaped configuration so as not to block the slots 44, 46. A retainer rail 66 is formed on the forward side of the upright member 62. The retainer rail 66 runs the entire height of the upright member 62 and extends beyond the bottom edge thereof into the enlarged-width portion of the second slot 46, which is wide enough to receive the retainer rail 66.

The retainer rail 66 is located directly above the tapered portion of the retainer seat 48 and preferably extends to a point flush with the bottom side of the thin portion 32 of the support bar 20, but not into the channel 34. When the slide member 24 is in its forward position, the first slot 44 in the tongue 42 is located between the retainer rail 66 and the tapered portion of the retainer seat 48, leaving an open path between the retainer rail 66 and the retainer seat 48. When the slide member 24 is pulled backward, the solid tip of the tongue 42 located forward of the first slot 44 is located between the retainer rail 66 and the tapered portion of the retainer seat 48, thereby blocking access between the retainer rail 66 and the retainer seat 48. The retainer rail 66 has a generally cross-shaped cross section and is sized so as to hold a stack of bolt retainers 12 thereon. That is, the retainer rail 66 has a cross-sectional size and shape such that bolt retainers can be slid onto or off either end of the rail 66 but are otherwise retained thereon. Preferably, the retainer rail 66 is tall enough to hold enough bolt retainers 12 for one compressor rotor assembly, or whatever application the device 10 is to be used with.

The spring housing block 56 includes a flat base that is attached to the support bar 20 (again, by any suitable fastening means such as screws or the like), immediately forward of the dispenser 54. The spring housing block 56 further includes a clevis 68 extending upwardly from the base. The constant force spring 58 is mounted to the clevis 68 by means of a nut and bolt fastener 70. The outer end of the constant force spring 58 is attached to the retaining block 60. The retaining block 60 has a groove 72 formed along the length thereof with inwardly directed lips 74 located on either side of the groove 72. The groove 72 is sized to slidingly receive the retaining rail 66 with the lips 74 engaging the retainer rail 66. The retaining block 60 thus can be slidingly mounted on the retaining rail 66, and the constant force spring 58 biases the retaining block 60 downward against the stack of bolt retainers 12 mounted on the rail 66. The bolt retainers 12 are thus retained on the retainer rail 66 and urged toward the retainer seat 48 with a constant force, regardless of the number of bolt retainers in the stack. The retaining block 60 can be manually pulled off the top of the retainer rail 66 to allow bolt retainers 12 to be loaded thereon.

The operation of the device 10 will now be described with reference to FIGS. 3–6. While these Figures show the device 10 being used to install bolt retainers 12 on slab head bolts 14 inserted into the outer flange 16 of a rear spool 18, it should be noted that this is for illustration purposes only. The present invention is not limited to this particular application, and can be used in many applications in which a bolt is inserted into a flange or similar structure.

Figure 3:
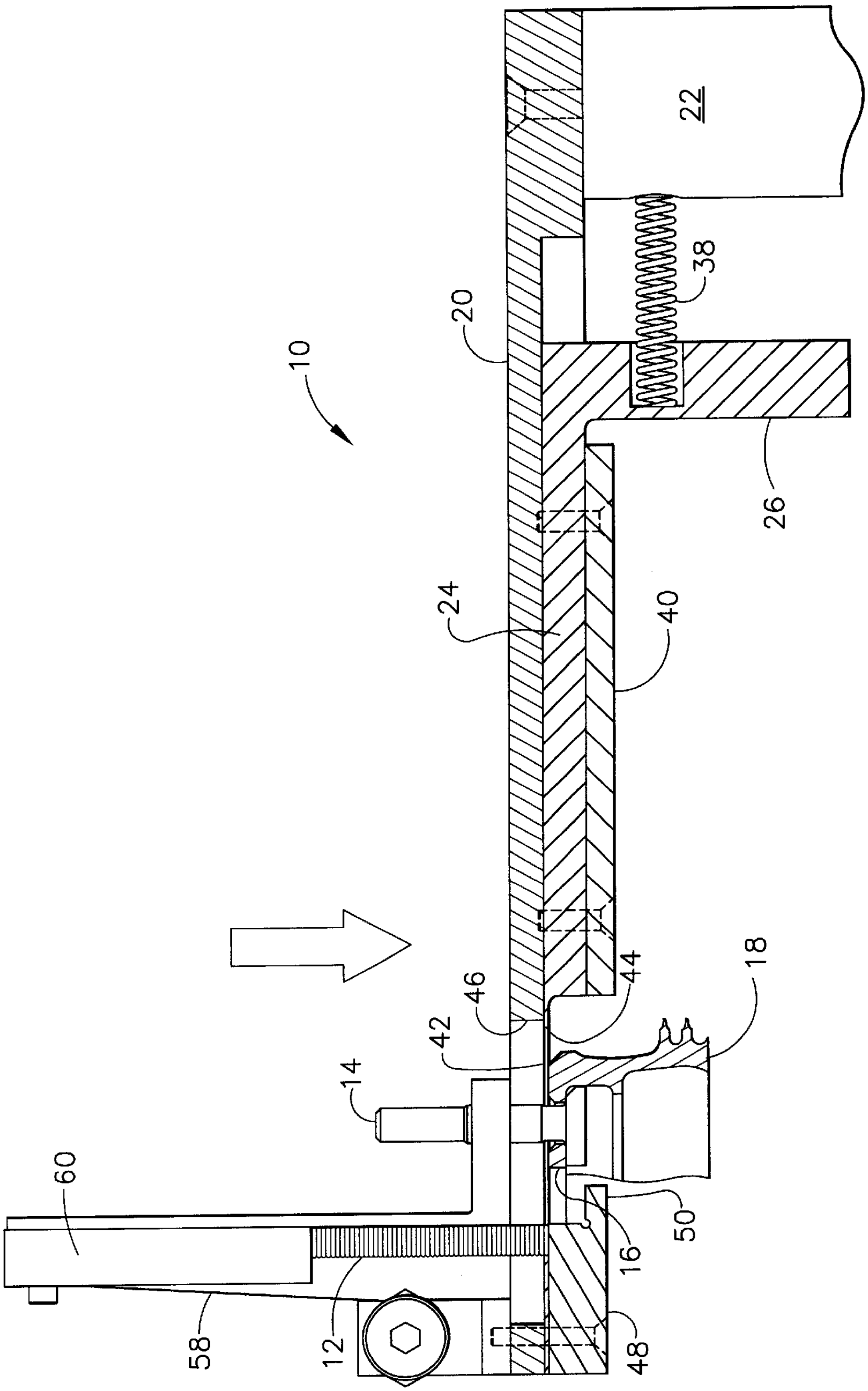
FIG. 3 is a cross-section view of the device for installing a bolt retainer showing the device being placed over a bolt.

The device 10 is prepared for use by pulling the retaining block 60 upward and off the top of the retainer rail 66. A sufficient number of bolt retainers 12 is then loaded onto the retainer rail 66, and the retaining block 60 is replaced on the retainer rail 66. Ideally, enough bolt retainers 12 for all the bolts 14 in the rear spool 18 are loaded into the device 10. With the device 10 now ready for operation, a bolt 14 is inserted into the rear spool flange 16. While the user holds the bolt 14 in place, the device 10 is placed over the bolt 14 and flange 16 so that the bolt 14 extends through the first and second slots 44, 46, as shown in FIG. 3. The bottom side of the support bar 20 is over the flange 16 and the retainer seat 48 extends below the flange 16.

Figure 4:
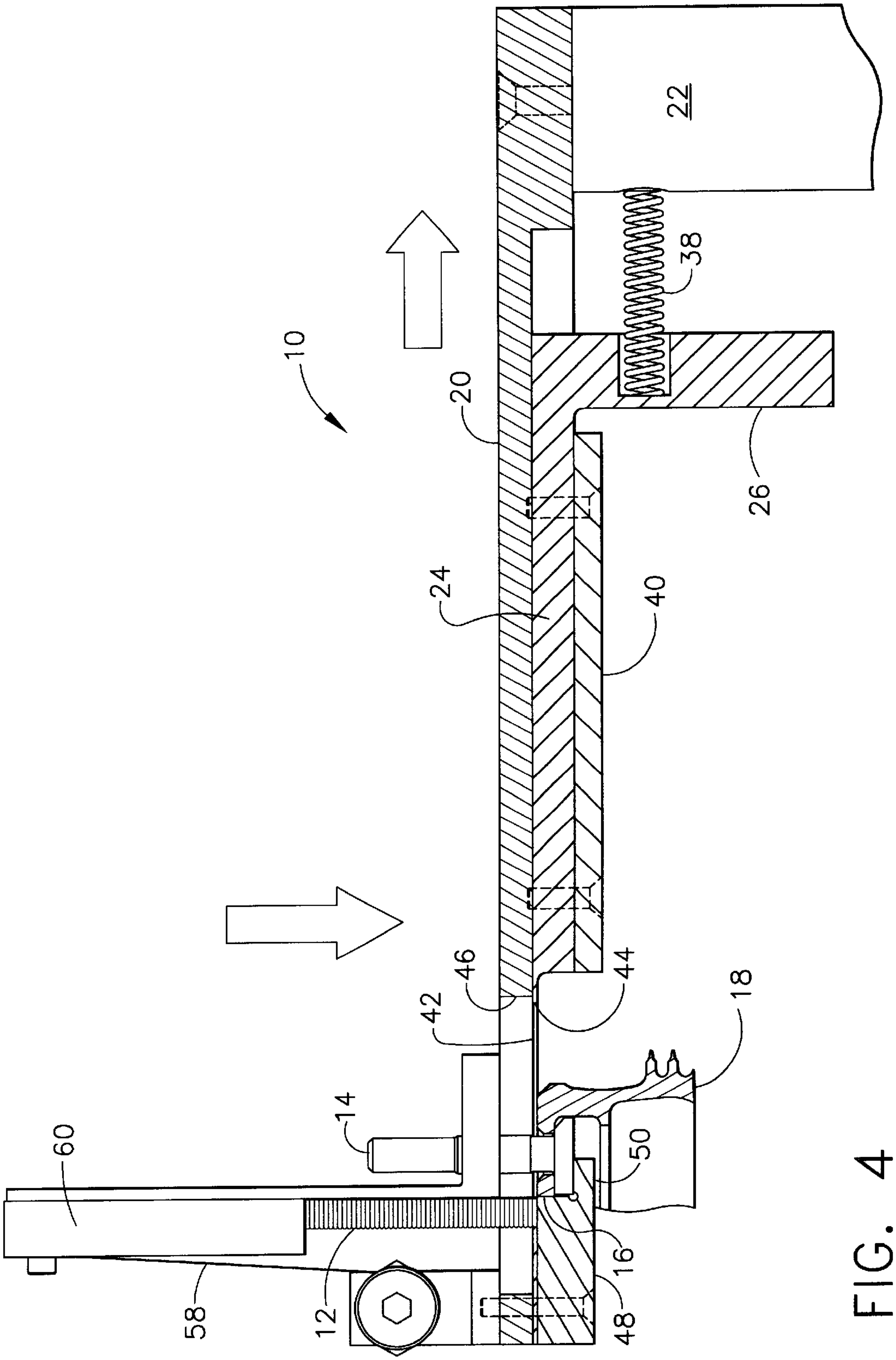
FIG. 4 is a cross-section view of the device for installing a bolt retainer showing the device engaging the bolt.

Next, the user pulls on the handle 22 so as to move the device 10 radially outward with respect to the rear spool 18. The device 10 is pulled outward until the flange 16 and the bolt head under the flange 16 are both disposed in the gap between the tab 50 on the retainer seat 48 and the support bar 20, as shown in FIG. 4. Thus, the tab 50 holds the bolt 14 in place during the rest of the installation process by supporting it from below. Specifically, the gap between the tab 50 and the support bar 20 is dimensioned so that the tab 50 will hold the bolt head against the underside of the flange 16 thus assuring that the bolt 14 will be in proper position to receive the bolt retainer 12.

Figure 5:
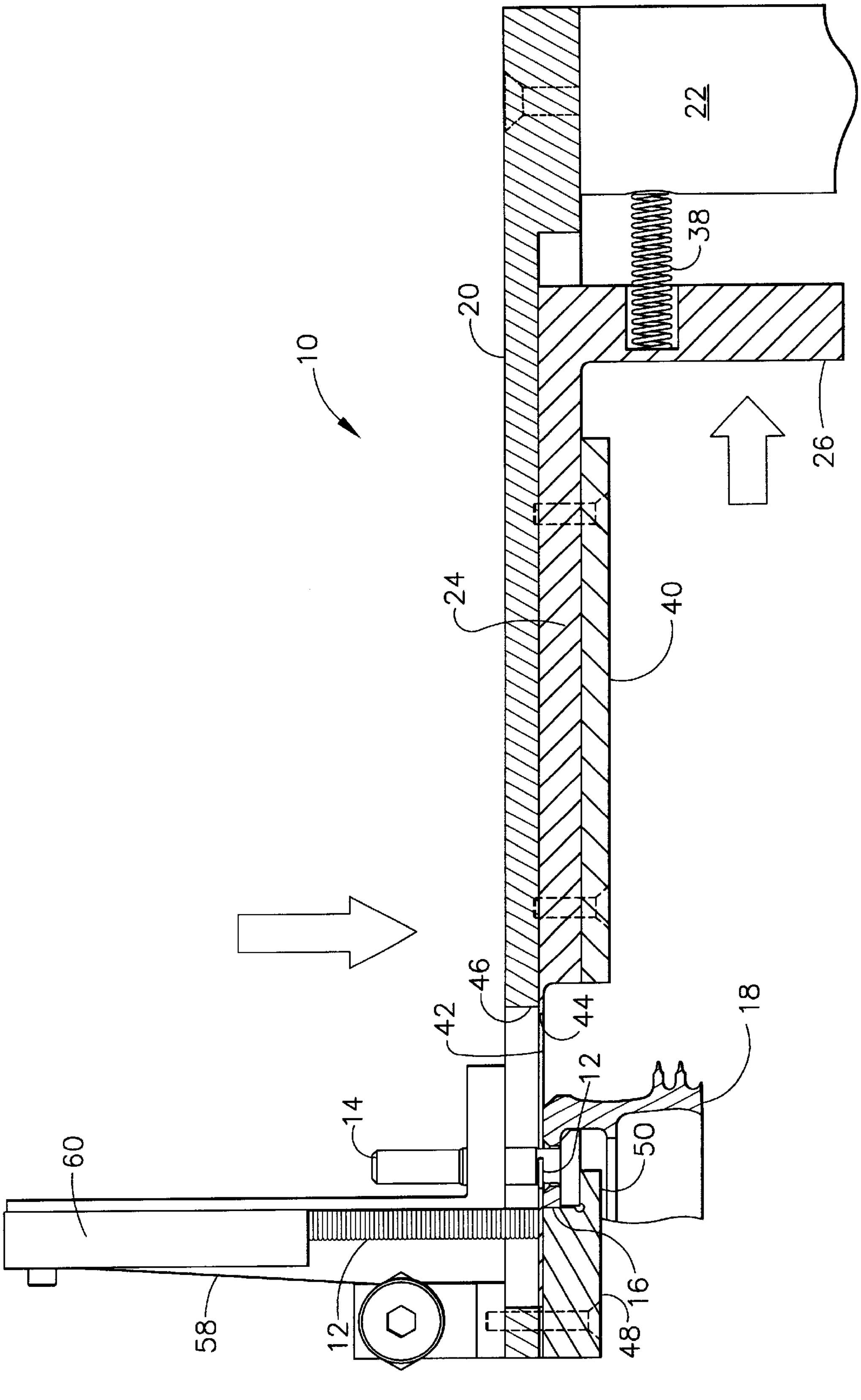
FIG. 5 is a cross-section view of the device for installing a bolt retainer showing the slide member retracted to push a bolt retainer onto the bolt
Figure 6:
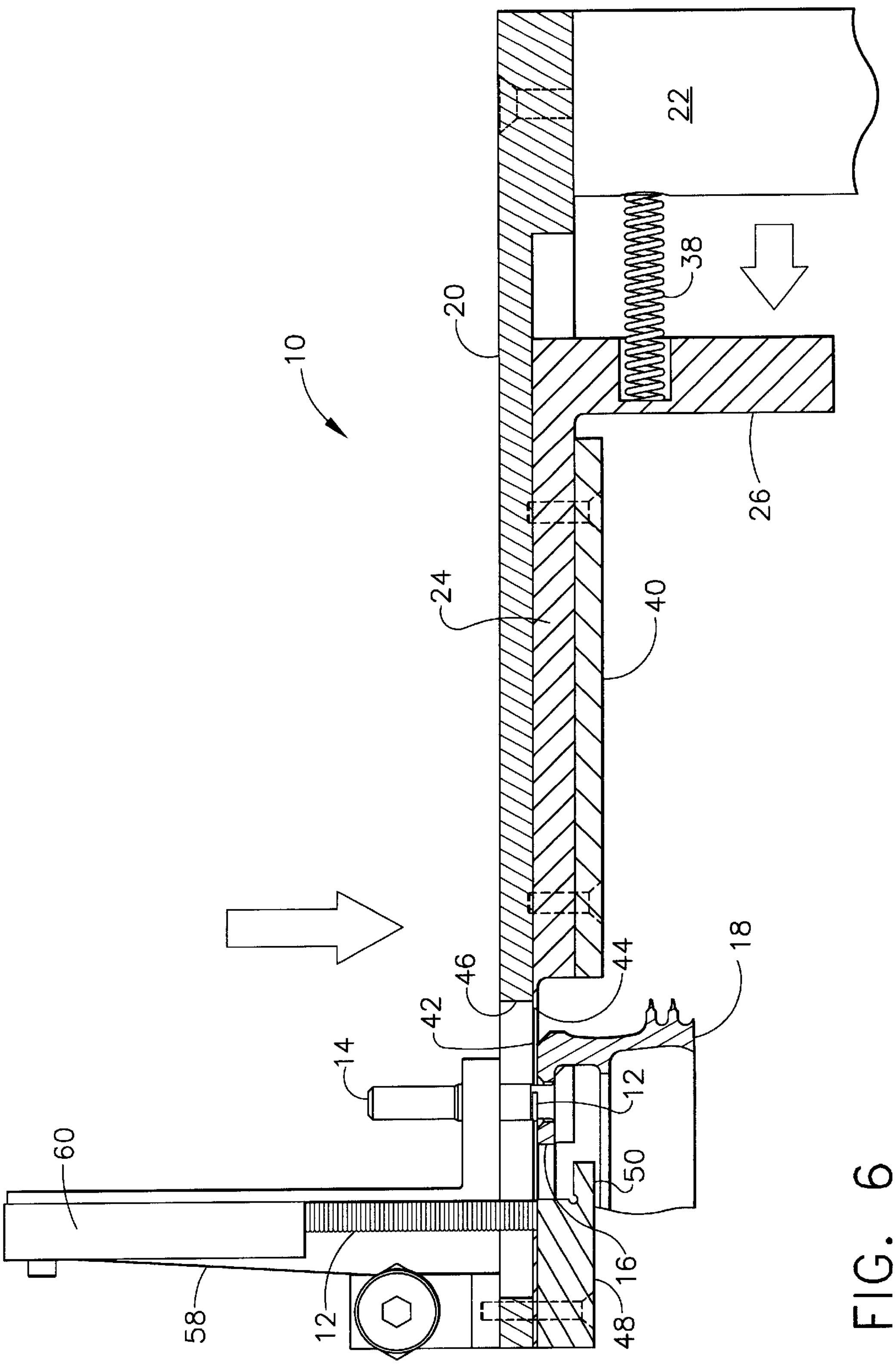
FIG. 6 is a cross-section view of the device for installing a bolt retainer showing the device after the bolt retainer has been installed onto the bolt.

With the device so positioned, the user pulls the trigger 26 to install a bolt retainer 12 onto the bolt 14. This part of the operation is depicted in FIGS. 5 and 6, where FIG. 5 shows the device 10 with the trigger 26 pulled and FIG. 6 shows the device 10 after the trigger 26 has been released. With the slide member 24 in its forward position, the first slot 44 in the tongue 42 is longitudinally aligned with the second slot 46 such that an open path is provided between the retainer rail 66 and the tapered portion of the retainer seat 48. This allows the lowermost bolt retainer 12 stacked on the retainer rail 66 to be forced into the first slot 44 and onto the retainer seat 48 by the constant force spring 58 and retaining block 60. When the user pulls the trigger 26 backward against the force of the compression spring 38, the tongue 42 engages the lowermost bolt retainer 12 in the first slot 44 and drives it backwards from the retainer seat 48 and onto the bolt 14 as shown in FIG. 5. The tongue 42 being slightly thinner than the bolt retainer 12 ensures that only one bolt retainer 12 is engaged at a time. With the slide member 24 in its rear position, the solid tip of the tongue 42 located forward of the first slot 44 prevents the next bolt retainer 12 from being forced onto the retainer seat 48.

Once the bolt retainer 12 has been installed on the bolt 14, the user releases the trigger 26. The compression spring 38 forces the sliding member 24 back to its forward position, where the slots 44, 46 realign and the next bolt retainer 12 in the stack is forced into the first slot 44 and onto the retainer seat 48 as shown in FIG. 6. The user then pushes the device radially inward with respect to the rear spool 18 to disengage the tab 50 from the bolt 14 and lifts the device 10 upward off the bolt 14. This completes the installation of the bolt retainer 12 onto the bolt 14. The bolt retainer installation process can then be repeated for each of the other bolts 14.

The foregoing has described a device for quickly and precisely installing bolt retainers onto bolts without damaging the bolt retainers, bolts or adjacent structure. While specific embodiments of the present invention have been described, it will be apparent to those skilled in the art that various modifications thereto can be made without departing from the spirit and scope of the invention as defined in the appended claims.

What is claimed is:

1. A device for installing a bolt retainer onto a bolt, said device comprising:

a support bar;

a handle attached to said support bar;

a retainer seat attached to said support bar;

a retainer dispensing assembly mounted on said support bar, said retainer dispensing assembly being located to deliver bolt retainers to said retainer seat; and means for driving a bolt retainer from said retainer seat onto a bolt.

2. The device of claim 1 wherein said retainer dispensing assembly includes a rail capable of holding a stack of bolt retainers thereon, a retaining block slidingly mounted on said rail, and a spring for biasing said retaining block onto said rail.

3. The device of claim 2 wherein said spring is a constant force spring mounted to said support bar and having one end attached to said retaining block.

4. The device of claim 2 wherein said support bar has a slot formed therein and said rail extends into said slot.

5. The device of claim 1 wherein said means for driving a bolt retainer is slide member slidingly mounted to said support bar.

6. The device of claim 5 wherein said support bar has a channel formed therein and said slide member is slidingly disposed in said channel.

7. The device of claim 6 wherein said slide member includes a trigger formed thereon and a tongue configured to engage a bolt retainer, said trigger extending out of said channel and said tongue being disposed in said channel.

8. A device for installing a bolt retainer onto a bolt, said device comprising:

a support bar having a channel formed in a first side thereof and a slot formed therethrough in said channel;

a handle attached to said support bar at a first end thereof;

a retainer seat attached to said first side of said support bar at a second end thereof and adjacent to said slot;

a retainer dispensing assembly mounted on a second side of said support bar, said retainer dispensing assembly including a rail that extends into said slot so as to align with said retainer seat, said rail being sized to hold a number of bolt retainers thereon; and a slide member slidingly mounted in said channel, said slide member sliding between a first position in which it engages a bolt retainer on said retainer seat and a second position in which it drives said bolt retainer onto a bolt.

9. The device of claim 8 wherein said retainer dispensing assembly further includes a spring housing block attached to said second side of said support bar, a retaining block slidingly mounted on said rail, and a constant force spring mounted to said spring housing block and having one end attached to said retaining block for biasing said retaining block onto said rail.

10. The device of claim 8 wherein said slide member includes a trigger formed thereon and a tongue configured to engage a bolt retainer, said trigger extending out of said channel and said tongue being disposed in said channel.

11. The device of claim 10 further comprising a guide block attached to first side of said support bar so as to retain said slide member in said channel, said guide block being positioned to define a gap between said guide block and said handle, said trigger extending through said gap.

12. The device of claim 10 wherein said tongue has a slot formed therethrough, said slot formed through said support bar and said slot formed through said tongue being longitudinally aligned when said slide member is in said first position.

13. The device of claim 12 wherein said sad slot formed through said support bar and said slot formed through said tongue both have a sufficient width to allow bolt retainers to pass therethrough.

14. The device of claim 12 wherein said tongue is thinner than a bolt retainer.

* * * * *